Dec. 30, 1969     G. T. BLACKWELL, JR     3,486,542
ADZING APPARATUS
Filed May 8, 1967
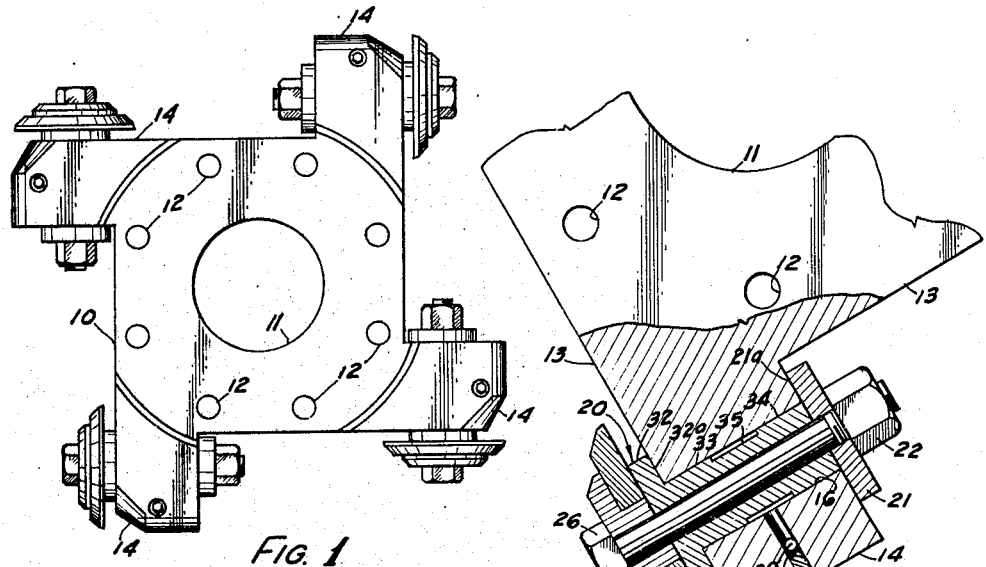
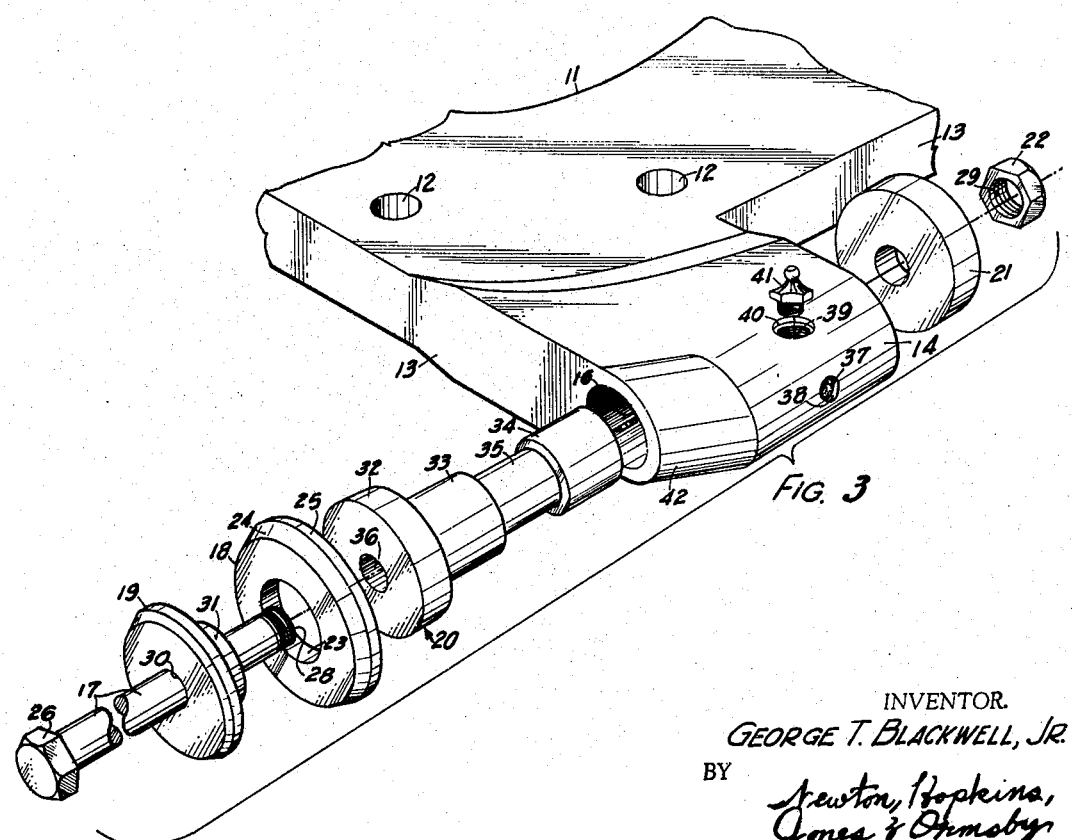
INVENTOR.
GEORGE T. BLACKWELL, JR.
BY
*Newton, Hopkins,*
*Jones & Ormsby*
ATTORNEYS

United States Patent Office 3,486,542
Patented Dec. 30, 1969

3,486,542
ADZING APPARATUS
George T. Blackwell, Jr., P.O. Box 278,
Oneonta, Ala. 35121
Filed May 8, 1967, Ser. No. 636,733
Int. Cl. B27g *13/14*
U.S. Cl. 144—133            5 Claims

ABSTRACT OF THE DISCLOSURE

Adzing apparatus of the type utilized to cut or groove railroad cross ties. The cutting surface is freely rotatable in the cutter head, supported in such a manner that it will not warp, bend or otherwise become deformed after prolonged use, and lubricated to insure its free rotation.

Background of the invention

In treating wood to create cross ties for railroad tracks, it is necessary to rapidly cut the wood in proper lengths and form grooves, gains or seats in the ties for the reception of rails or rail chairs which support the rails. Because of the particular configuration of the seats that must be formed in the cross ties, special cutting tools have been utilized that are capable of rapidly cutting the ties with seats of the proper dimension. As is disclosed in U.S. Patent No. 3,005,479, it is desirable to mount the cutting surface so that it is free to rotate while the cutting tool is in operation in order that different portions of the cutting surface come into contact with the surface being cut on each rotation of the tool. This prolongs the life of the cutting surface; however, it has been found that the conventional support utilized to support the rotatable cutter eventually becomes warped, bent, or otherwise deformed after prolonged use and usually does not last as long as the cutter itself.

Summary of the invention

This invention relates to an improved adzing apparatus that includes support means that allow the cutting bit to rotate but will not warp or bend during normal operation.

Accordingly, it is object of this invention to provide an adzing apparatus which includes support means constructed and arranged to support a rotatable cutter.

Another object of this invention is to provide a cutter support apparatus for an adzing apparatus.

Another object of this invention is to provide a cutter and its support means for an adzing apparatus that is economical to manufacture, simple in construction, suitable for prolonged use and easily repaired or replaced in the field.

Other objects, features and advantages of the present invention will become apparent upon reading the following disclosure when taken in conjunction with the accompanying drawing.

Brief description of the drawing

FIG. 1 is a plan view of an adzing cutter head.

FIG. 2 is a plan view, with parts broken away and partially in cross section of an adzing cutter head with a disc cutting bit attached thereto and supported thereon according to the present invention.

FIG. 3 is an exploded perspective view of a portion of an adzing cutter head, showing the manner in which the rotatable cutter is attached thereto.

Description of an embodiment

Referring now more particularly to the drawing, in which like numerals indicate like parts throughout the several views, FIG. 1 shows a cutter head 10 of an adzing apparatus which defines a large central opening 11 and a plurality of smaller openings 12 equally radially spaced about the central opening 11. Central opening 11 is adapted to fit over a hub of a rotary drive means while the peripheral openings 12 are adapted to be aligned with similar openings of the hub and receive connecting bolts therethrough. The cutter head 10 includes a plurality of cutter support projections 14 spaced about its circumference. The cutter support projections 14 extend at an angle with respect to a radius extending outwardly from the central opening 11 of the cutter head 10, generally tangentially from central opening 11. The cutter head 10 is constructed to rotate in the direction as indicated by arrow 15 so that the cutter support projections 14 are angled toward the direction of rotation of the cutter head.

The cutter head 10 and its support projections 14 are substantially flat, and each cutter support projection 14 defines a through bore 16 having its longitudinal axis disposed in the plane of the cutter head and at an angle generally perpendicular with respect to the direction in which its projection 14 extends.

A cutting assembly is adapted to be inserted into and supported by the through bore 16. The cutting assembly includes bolt 17, cutting bit 18, external bushing 19, internal bushing 20, washer 21, and nut 22. Cutting bit 18 is generally disc-shaped and centrally apertured at 23. The edge of the cutting bit is tapered at 24 at an angle of approximately 35° from its flat surface toward the direction of rotation of the adzing apparatus, and tapered again at 25, at its periphery, at an angle of approximately 70° from its flat surface. Bolt 17 includes a head 26 at one end and threads 28 at its other end. The threads 28 are adapted to receive nut 22 which includes internal threads 29.

External bushings 19 each define a central aperture 30 which is dimensioned to tightly receive the shank of bolt 17, and includes annular projection or shank 31 of external diameter approximately equal to the internal diameter of central aperture 23 of cutting bit 18. Internal bushings 20 each include spacer portion 32 at one end, bearing portions 33 and 34 adjacent spacer portion 32 at the other end, and reduced portion 35 intermediate bearing portions 33 and 34. The length of each internal bushing 20 between spacer portion 32 and the end of bearing portion 34 is slightly larger than the length of bore 16 of each projection 14, and the diameter of each bearing 33 and 34 is approximately equal to the internal diameter of bore 16. Internal bushings 20 also each define a central through bore 36 of a diameter approximately equal to the outside diameter of the shank of bolt 17. Thus, bearing portions 33 and 34 and reduced portion 35 are dimensioned to be rotatably received in through bore 16 of the cutter support projection 14 while spacer portion 32 limits the movement of the bearing portions through the bore 16.

With this construction, the cutting bit 18 of each projection 14 can be mounted adjacent the cutter support projections 14 by inserting bolt 17 through central aperture 30 of external bushing 19, through central aperture 23 of cutting bit 18, and through the bore 36 of internal bushing 20. Cutting bit 18 is inserted over shank 31 of external bushing 19, internal bushing 20 is inserted through bore 16 of projection 14, bolt 17 is inserted through washer 21 on the remote side of projection 14, and nut 22 is threaded onto the portion of bolt 17 protruding from projection 14 and washer 21. Of course, threading the nut 21 onto the bolt 17 compresses the assembly into the position as shown in FIGS. 1 and 2. Since the shank of the bolt 17 is tightly received through the central aperture 30 of external bushing 19 and through the bore 36 of internal bushing 36, bolt 17, cutting bit 18, bushings 19 and 20, and nut 21 will be firmly attached to each other in such a manner that rotation of any one of these elements tends to cause equal rotation of the remaining elements. Thus, the exterior annular surfaces of bearing portions 33 and 34 of internal bushing 20 and the inwardly facing surfaces 32a and 21a of the spacer portion of internal bushing 20 and washer 21, respectively, form bearing surfaces for each cutting assembly.

Because of the friction forces encountered by the bearing portions 33 and 34 of internal bushings 20, it is desirable to lubricate these surfaces from time to time. Accordingly, cutter support projections 14 have small diameter lubricating ducts 37 cut therein from the extremity of projections 14 to communicate with through bores 16 in the vicinity of reduced portions 35 of internal bushings 20. The outer opening of ducts 37 are closed by welding plug 38, or the like, and a side bore 39 extends from the side surface of each projection 14 and communicates with duct 37. Side bores 39 are counterbored at 40 to form a recess in the side of each projection 14 about bores 39. Sealing caps 44 are provided to be threadedly received in the side bores 39. With this arrangement, bushing 20 can be lubricated from time to time through side bores 39 and ducts 37, and a supply of lubricating substance can be retained in the space within bore 16 of projection 14 surrounding reduced portion 35 of internal bushing 20 and dissipated gradually as the adzing apparatus is used.

The cutter support projections 14 are disposed at such an angle with respect to the cutter head 10 that the periphery of the cutting bit 18 extends further away from the center of the cutter head 10, and when the cutter head 10 is rotated, the periphery of the cutting bit 18 defines the outside diameter of the moving elements of the adzing apparatus, and will therefore be the portion of the apparatus that comes into contact with and cuts away portions of railroad ties. Also, projections 14 are beveled at 42, adjacent cutting bit 18, to further remove the extremity of projection 14 from the path of cutting bit 18.

Operation

When the cutter head 10 of the adzing apparatus rotates in the direction as indicated by arrow 15, the outer periphery of each cutting bit 18 travels through a path as indicated by arrow 44. When the cutter head is moved into contact with railroad cross ties, the cutting bits engage and cut away the wood. Of course, the forces exerted on each cutting bit tend to move it, with respect to the cutter head 10, in a direction opposite to that indicated by arrow 40. Since each cutting bit 18 is supported at a point in its support projection 14 disposed inwardly of and ahead of its point of contact with the wood, each cutting bit 18 tends to pivot in a clockwise direction (FIGS. 1 and 2) about its cutter support projection 14. Normally, this force tends to bend and eventually break the shank or head of each bolt 17. However, in the instant invention, the placement of the spacer portion 32 of each internal bushing 20 against the surface of each cutting bit 18 tends to support each cutting bit on the rear surface 13 of the cutter support projection 14 and to absorb a considerable amount of the bending forces that would normally be exerted on the shank of the bolt 17. The rigid connection between the spacer portion 32 of each internal bushing 20, its cutting bit 18 and external bushing 19 is such that these elements are firmly compressed together and gain mutual support from each other. Spacer portion 32 of internal bushing 20 provides a broad base of support for the cutting bit 18, and shank 31 of external bushing 19 provides a large support area for aperture 23 of the cutting bit. Thus, each cutting bit has the strength characteristics of the support surfaces of both the internal and external bushings added to it.

The diameter of bearing portions 33 and 34 of internal bushings 20 are considerably larger than the diameter of bolts 17 and present a large bearing surface to the interior surface of the through bore 16 of the support projections 14. Thus, the forces transmitted to the internal bushings 20 by the cutting bit 18 are spread over a large area, and dissipated over a large surface. This tends to make the bolt 17 more effective in its support characteristics, yet the bolt, cutting bit, and bushings are rotatable within the bore 16 so that the cutting bit can be rotated in the operation of the cutter head to eventually present its entire cutting edge to the substance being cut. Even if bolts 17 should become warped or bent, internal bushings 20 would, in most instances, continue to rotate in bores 16 since the reduced diameter of reduced portions 35 will allow some bending of internal bushings 20 without binding in bores 16.

The presence of the washers 21 adjacent the leading face of the cutter support projections 14 tends to spread the force exerted by the nut 21 over a relatively large surface of the leading face 13, thereby magnifying the effectiveness of the nut while still using the relatively small bolt 17. Thus, the forces exerted on the cutting bit 18 in the direction generally opposite to that indicated by arrow 40 will be spread substantially over the inwardly facing surfaces 21a of washers 21, or over a larger area than just the inside surface of the nut 21.

The configuration of beveled portions 42 of projections 14 permits the exposure of a large portion of cutting bits 18 while retaining high strength characteristics in the remaining portion of the projections. The placement of lubricating ducts 37 radially outwardly of bores 16 of projections 14 prevents the weakening of either side of projections 14 in the vicinity of their bores 16, and the placement of side bores 39 on the side of projections 14, but removed from the vicinity of bores 16, also prevents weakening of projections 14, yet removes sealing caps 41 from the periphery of projections 14. Counter bores 40 protect sealing caps 41 from injury during the operation of the apparatus.

At this point, it will be understood that the support elements for the cutting bit provide a maximum of support and lubrication, prevent bending, warping or other damage to the bolt, and are simple in construction and assembly.

It will be obvious to those skilled in the art that many variations may be made in the embodiments chosen for the purpose of illustrating the present invention without departing from the scope thereof as defined by the appended claims.

What is claimed as invention is:

1. In adzing apparatus of the type utilized to cut railroad cross ties including a rotatable cutter head with a plurality of support projections extending outwardly therefrom, each support projection defining a through bore disposed at an angle other than perpendicular with respect to a radius extending from said cutter head through said through bore, the improvement comprising cutting apparatus including:

(a) a disc-shaped cutting bit defining a central aperture, (b) a first bushing including a head portion of a diameter slightly smaller than the diameter of said cutting bit abutting one surface of said cutting bit, and a shank portion of a diameter generally equal to the diameter of the central aperture of the cutting bit and inserted into said central aperture, said first bushing defining a central aperture, (c) a second bushing including a spacer portion of a larger diameter than the through bore of the support projection, a first bearing portion of diameter generally equal to the diameter of the through bore adjacent said spacer portion, a reduced portion of a diameter smaller than said first bearing portion adjacent said first bearing portion, and a second bearing portion of a diameter generally equal to the diameter of said first bearing portion adjacent said reduced portion, said second bushing defining a central aperture therethrough, and (d) fastening means rotatably connecting said cutting bit and bushings to the cutter head including a bolt having an enlarged head engaging said first bushing and urging said first bushing into fractional engagement with said cutting bit, and said cutting bit into frictional engagement with said second bushing, whereby said cutter and bushings tend to rotate in unison.

2. Cutting apparatus for adzing apparatus of the type including a rotatable cutter head and a plurality of support projections each extending generally radially therefrom and defining through bores, said cutting apparatus comprising:

a cutting bit defining a central aperture, a first bushing comprising an enlarged head portion juxtaposed said cutting bit and a shank portion extending through the central aperture of said cutting bit, a second bushing including a spaced portion juxtaposed said cutting bit of a diameter larger than the through bore of said support projections and at least one bearing portion extending into and rotatably supported in the bore of a support projection, and connecting means for rigidly connecting together said cutting bit and said bushings.

3. The invention of claim 2 wherein said connecting means includes an enlarged head portion juxtaposed the head portion of said first bushing on the side opposite from said cutting bit and a shank portion passing through said cutting bit and said bushings.

4. The invention of claim 2 wherein said second bushing defines with the through bore of said support projection an annular space, and said support projection includes duct means for inserting lubricant into said annular space.

5. The invention of claim 4 wherein said duct means includes a counter bore, and a seal member received in said counter bore.

References Cited

UNITED STATES PATENTS

| | | | |
|---|---|---|---|
| 1,088,209 | 2/1914 | Collet | 144—133.5 |
| 2,887,135 | 5/1959 | Fox et al. | 144—133 |
| 3,005,479 | 10/1961 | Blackwell | 144—134 |

FOREIGN PATENTS

Ad. 1,175  3/1873  Great Britain.

GIL WEIDENFELD, Primary Examiner

U.S. Cl. X.R.

144—218